(12) United States Patent
Gavriliuc et al.

(10) Patent No.: US 10,890,237 B2
(45) Date of Patent: Jan. 12, 2021

(54) ACTUATOR WITH BALL NUT

(71) Applicant: Eaton Intelligent Power Limited, Dublin (IE)

(72) Inventors: Sorin Gavriliuc, Caledonia, MI (US); Aaron M. Klap, Rockford, MI (US); Gerald R. Swedenberg, Lowell, MI (US)

(73) Assignee: Eaton Intelligent Power Limited, Dublin (IE)

( * ) Notice: Subject to any disclaimer, the term of this patent is extended or adjusted under 35 U.S.C. 154(b) by 189 days.

(21) Appl. No.: 16/150,538

(22) Filed: Oct. 3, 2018

(65) Prior Publication Data
US 2019/0101197 A1 Apr. 4, 2019

Related U.S. Application Data

(60) Provisional application No. 62/567,397, filed on Oct. 3, 2017.

(51) Int. Cl.
*F16H 25/24* (2006.01)
*F16H 25/22* (2006.01)
*B64C 13/28* (2006.01)

(52) U.S. Cl.
CPC ......... *F16H 25/2472* (2013.01); *B64C 13/28* (2013.01); *F16H 25/2228* (2013.01)

(58) Field of Classification Search
CPC .. F16H 25/2472; F16H 25/2228; B64C 13/28
See application file for complete search history.

(56) References Cited

U.S. PATENT DOCUMENTS

| | | | | | |
|---|---|---|---|---|---|
| 2,779,207 | A | * | 1/1957 | Hamilton | F16H 25/2204 74/424.72 |
| 3,382,731 | A | * | 5/1968 | Whicker | F16H 25/2209 74/424.72 |
| 3,393,577 | A | * | 7/1968 | Better | F16H 25/2209 74/424.72 |
| 4,730,503 | A | * | 3/1988 | Rosenthal | F16H 25/122 74/58 |
| 4,799,734 | A | * | 1/1989 | Periou | F16B 1/00 297/362.14 |
| 5,582,072 | A | * | 12/1996 | Yamaguchi | F16H 25/2209 74/424.72 |
| 6,422,101 | B2 | * | 7/2002 | Erikson | B23Q 5/40 74/424.72 |

(Continued)

*Primary Examiner* — David M Fenstermacher
(74) *Attorney, Agent, or Firm* — Fishman Stewart PLLC

(57) ABSTRACT

An actuator includes a drive assembly, a ball screw, and a ball nut. The ball nut may include a first nut member, a second nut member; and first arm extending from the first nut member. The first arm may include a first portion and a second portion. The first portion may extend radially outward from the first nut member. The second portion may extend substantially axially from the first portion such that at least some of the second portion is disposed radially outward of the second nut member. A second arm may extend from the second nut member, and the second arm may include a first portion and a second portion. In embodiments, at least part of the second portion of the first arm is disposed radially outward of at least a part of the second portion of the second arm.

20 Claims, 8 Drawing Sheets

(56) References Cited

U.S. PATENT DOCUMENTS

| | | | | |
|---|---|---|---|---|
| 6,467,362 B2 * | 10/2002 | Erikson | .................... | B23Q 5/40 |
| | | | | 74/424.72 |
| 6,516,680 B1 * | 2/2003 | Nakamura | ........... | B62D 5/0445 |
| | | | | 74/388 PS |
| 7,458,292 B2 * | 12/2008 | Scholz | ................ | F16H 25/2472 |
| | | | | 74/424.72 |
| 7,891,265 B2 * | 2/2011 | Erikson | ............... | F16H 25/2006 |
| | | | | 310/75 D |

* cited by examiner

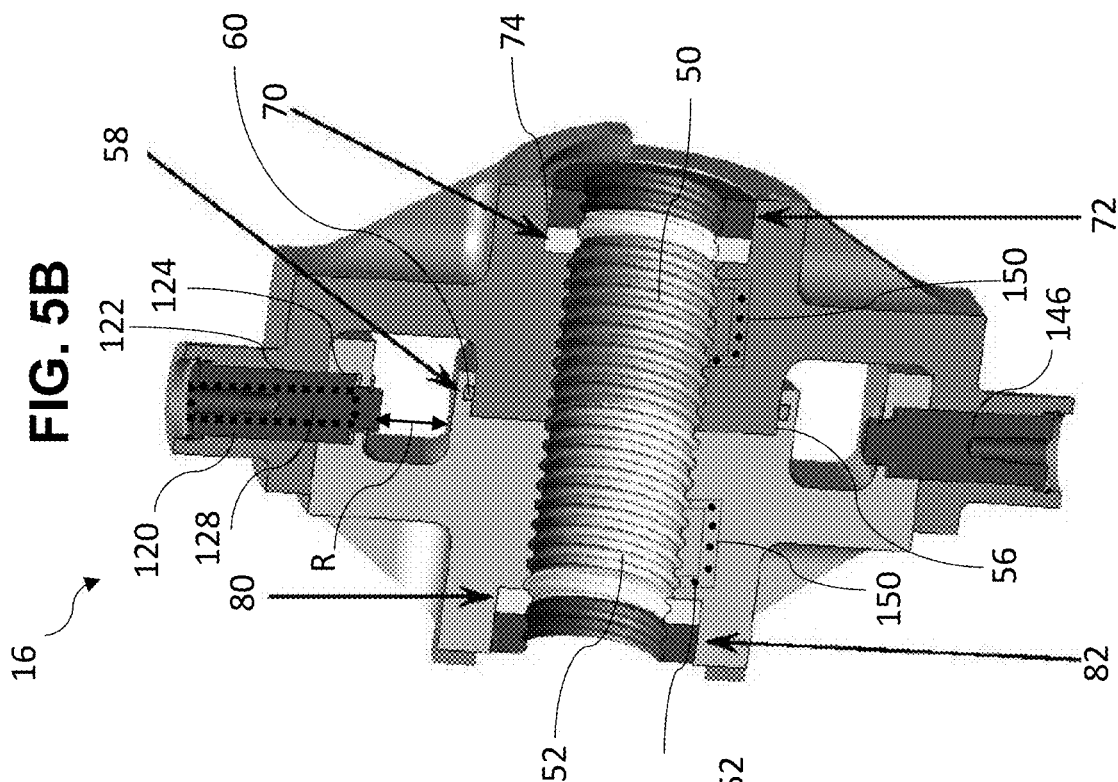
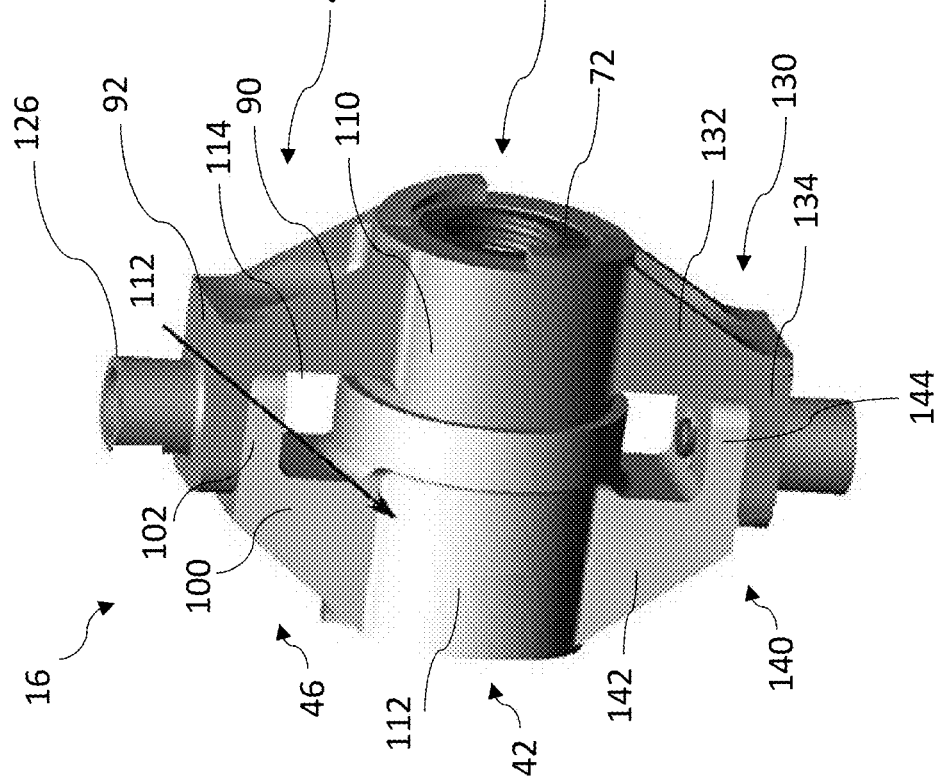
FIG. 5B
FIG. 5A

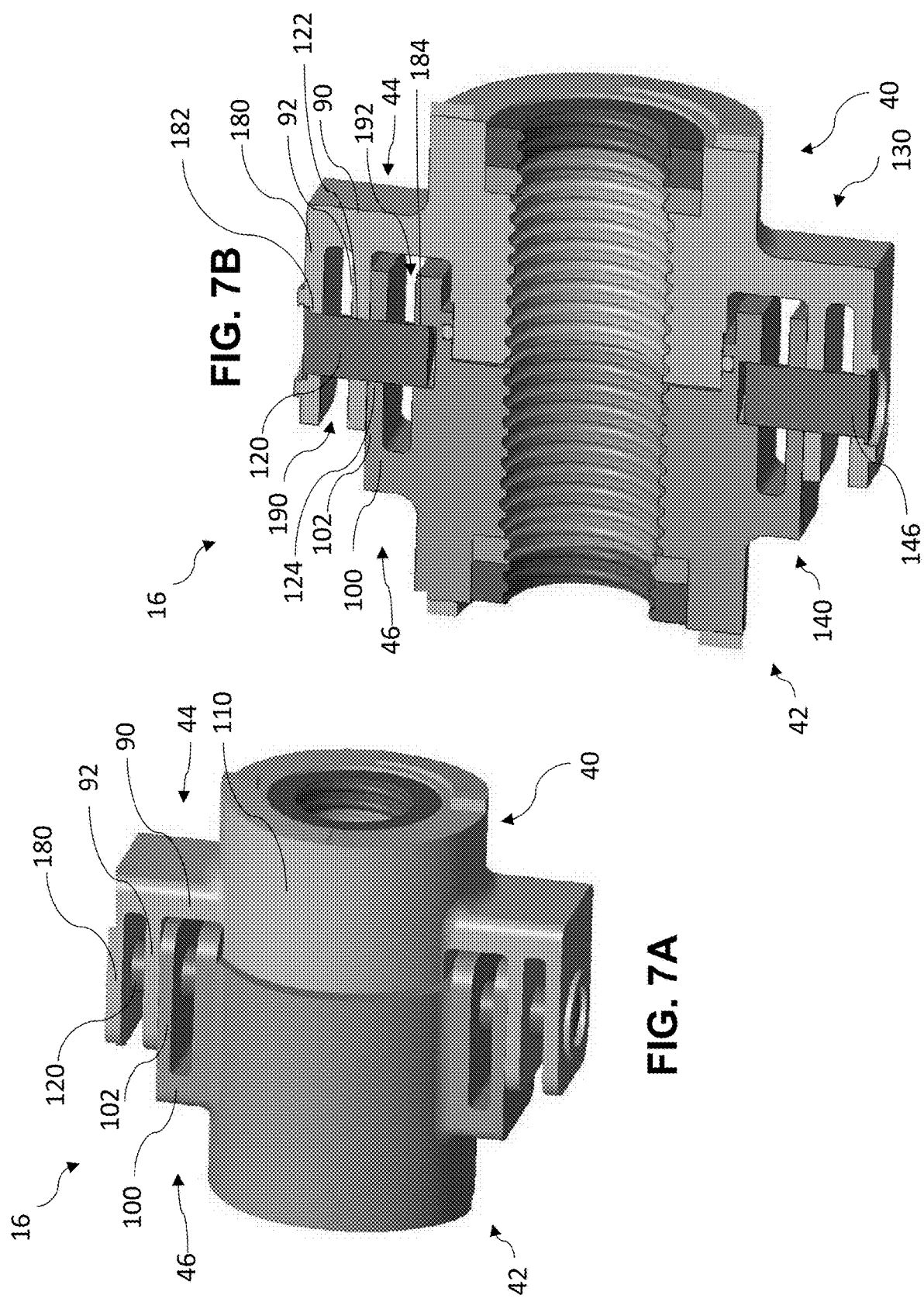

ACTUATOR WITH BALL NUT

CROSS-REFERENCE TO RELATED APPLICATION

This application claims the benefit of U.S. Provisional Patent Application Ser. No. 62/567,397, filed on Oct. 3, 2017, the disclosure of which is hereby incorporated herein by reference in its entirety.

TECHNICAL FIELD

The present disclosure generally relates to actuators, including linear actuators with ball nuts and balls screws that may, for example and without limitation, be used in connection with aircraft, such as with horizontal trim stabilizers.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some aircraft actuation systems may include and/or require redundancies in mechanical sub-assemblies. Actuators, such as actuators including ball screw assemblies, may include redundancies. With existing assemblies, certain primary or backup components may be disposed internally and may therefore not be visually accessible. In such assemblies, component failures may not be visually identified during inspection and may involve more sophisticated failure detection methods (e.g., increased performance monitoring, stress gauges, electrical continuity checks, etc.). These additional methods may add an increased concern regarding complexity, reliability, precision, and/or cost.

Redundant ball nut arrangements may be used in the aerospace industry, such as for critical flight applications. One redundant ball nut arrangement may include a primary functional nut and a backup component (designed in the form of an enclosure) without motion functionality, which may hold together the primary nut in case of failure. The concept may be completed with redundant attachments. In such an arrangement, the components inside the secondary nut/enclosure are not visually accessible.

There is a desire for solutions/options that minimize or eliminate one or more challenges or shortcomings of actuators, ball screws, and/or ball nuts. The foregoing discussion is intended only to illustrate examples of the present field and should not be taken as a disavowal of scope.

SUMMARY

In embodiments, an actuator may include a drive assembly, a ball screw, and/or a ball nut. The ball nut may include a first nut member, a second nut member; and an arm extending from the first nut member. The arm may include a first portion and a second portion. The first portion may extend radially outward from the first nut member. The second portion may extend substantially axially from the first portion such that at least some of the second portion is disposed radially outward of the second nut member.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 5A is a perspective view of an embodiment of a ball nut according to teachings of the present disclosure.

FIG. 5B is a cross-sectional perspective view of an embodiment of a ball nut according to teachings of the present disclosure.

FIG. 7A is a perspective view of an embodiment of a ball nut according to teachings of the present disclosure.

FIG. 7B is a cross-sectional perspective view of an embodiment of a ball nut according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
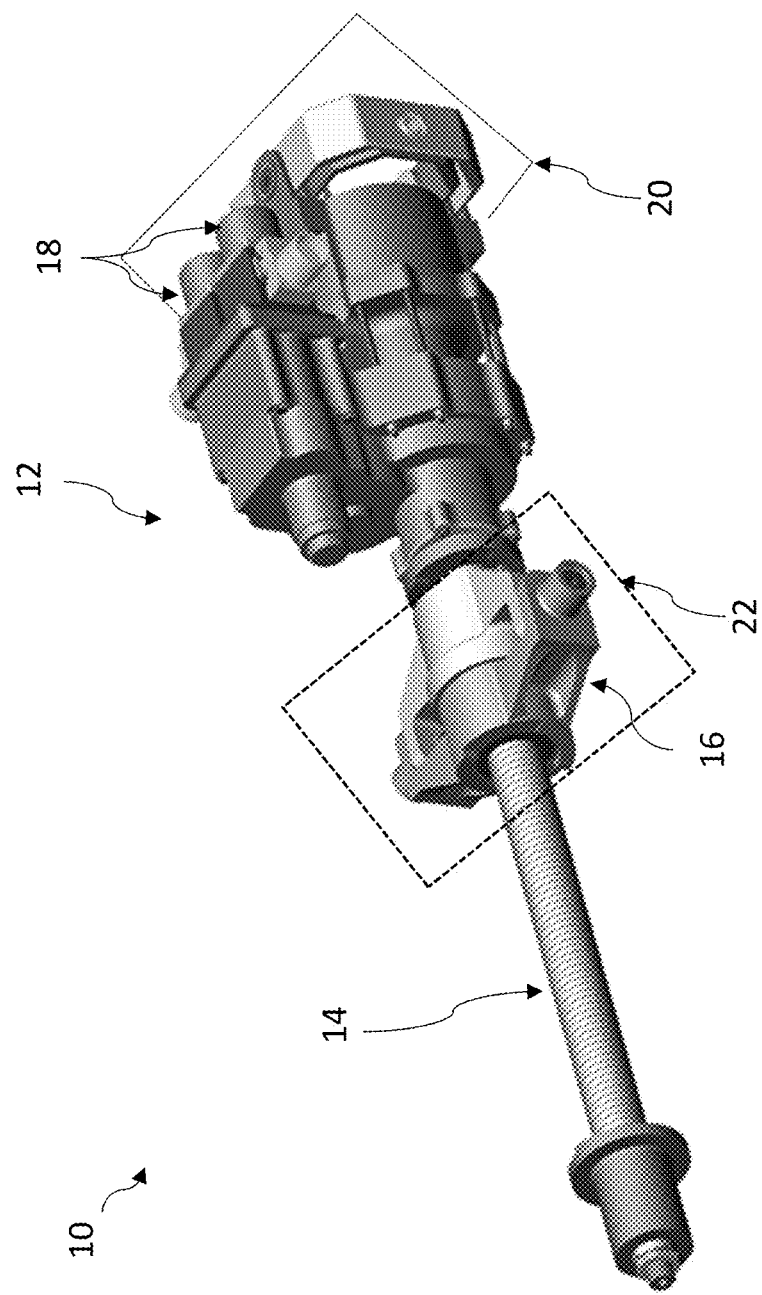
FIG. 1 is a perspective view of an embodiment of an actuator including a ball nut, and components connected thereto, according to teachings of the present disclosure.
Figure 2:
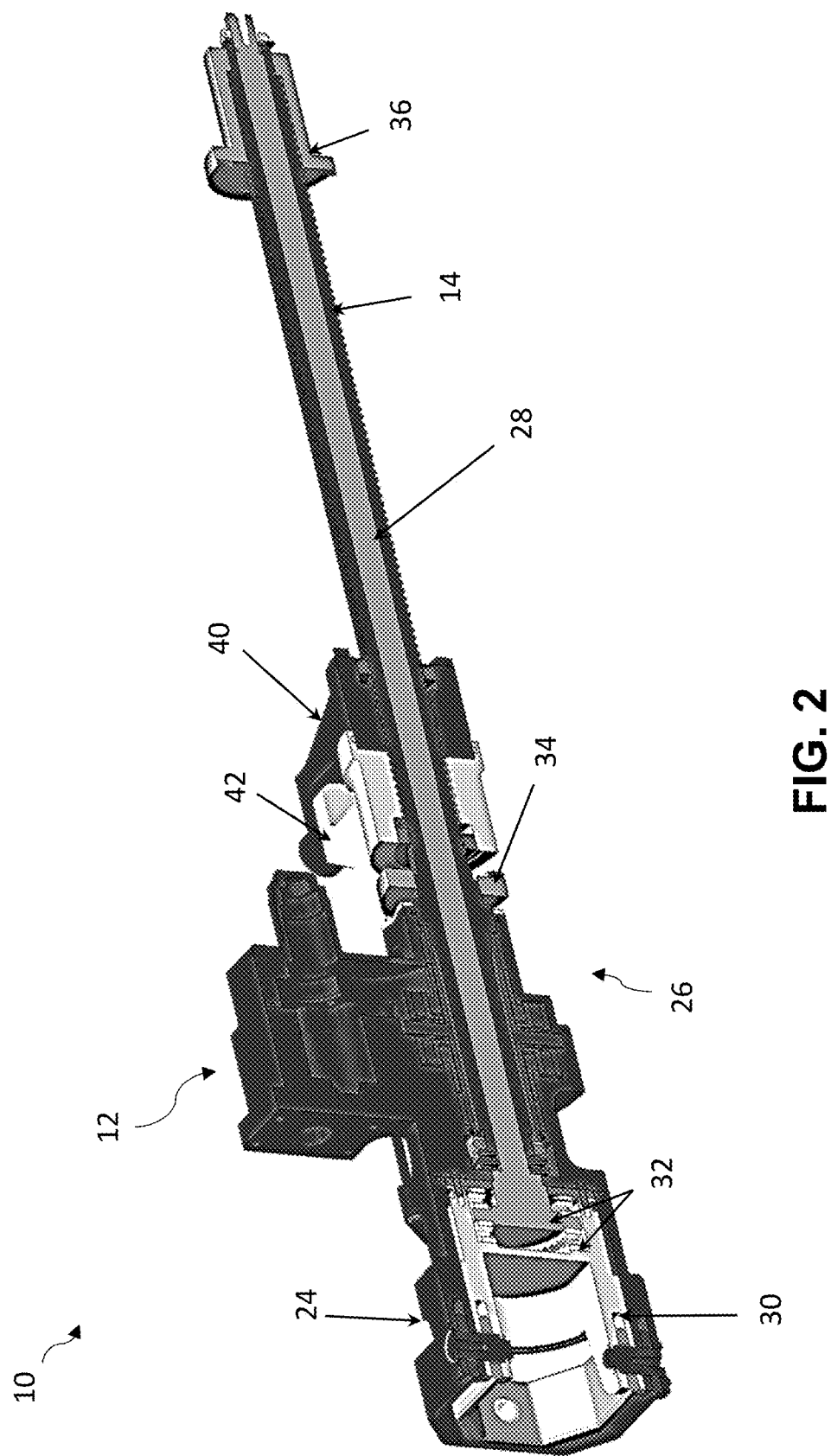
FIG. 2 is a cross-sectional perspective view of an embodiment of an actuator including a ball nut according to teachings of the present disclosure.
Figure 3:
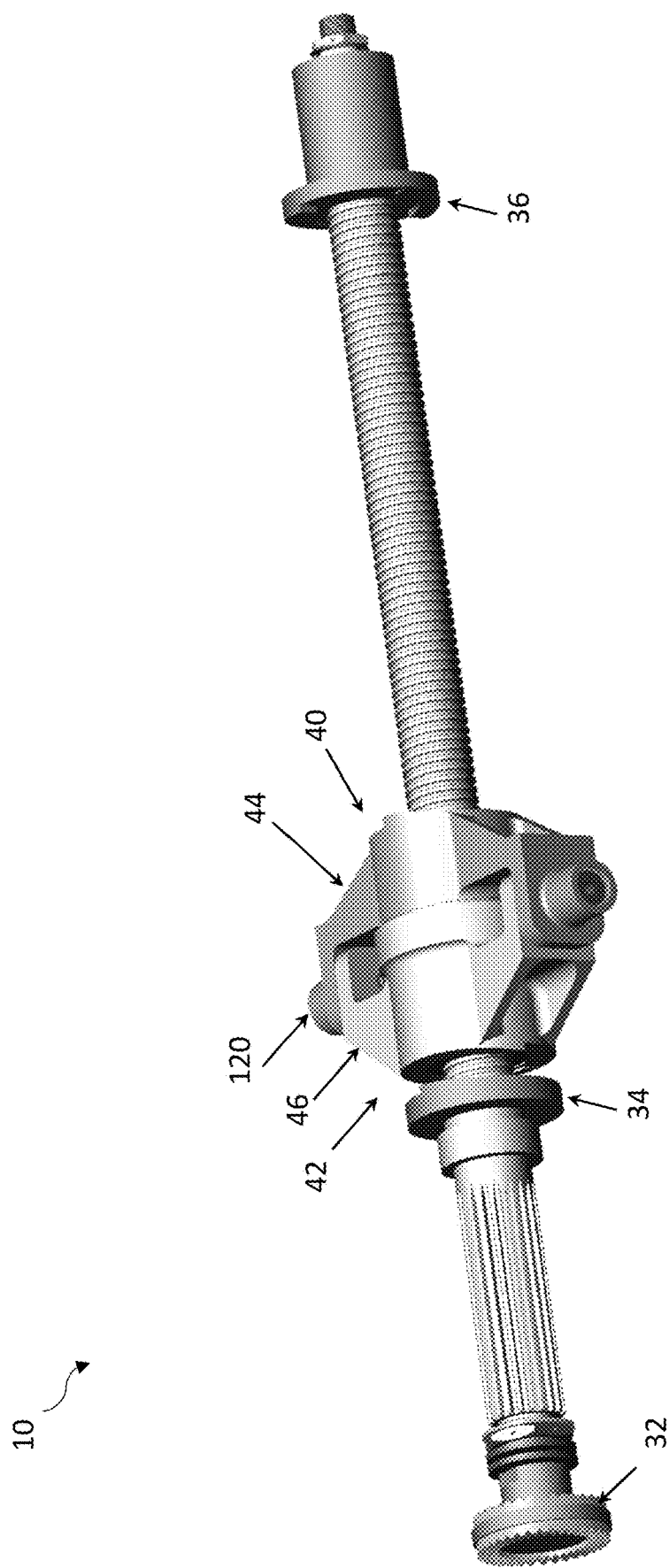
FIG. 3 is a perspective view of an embodiment of an actuator including a ball nut according to teachings of the present disclosure.
Figure 4:
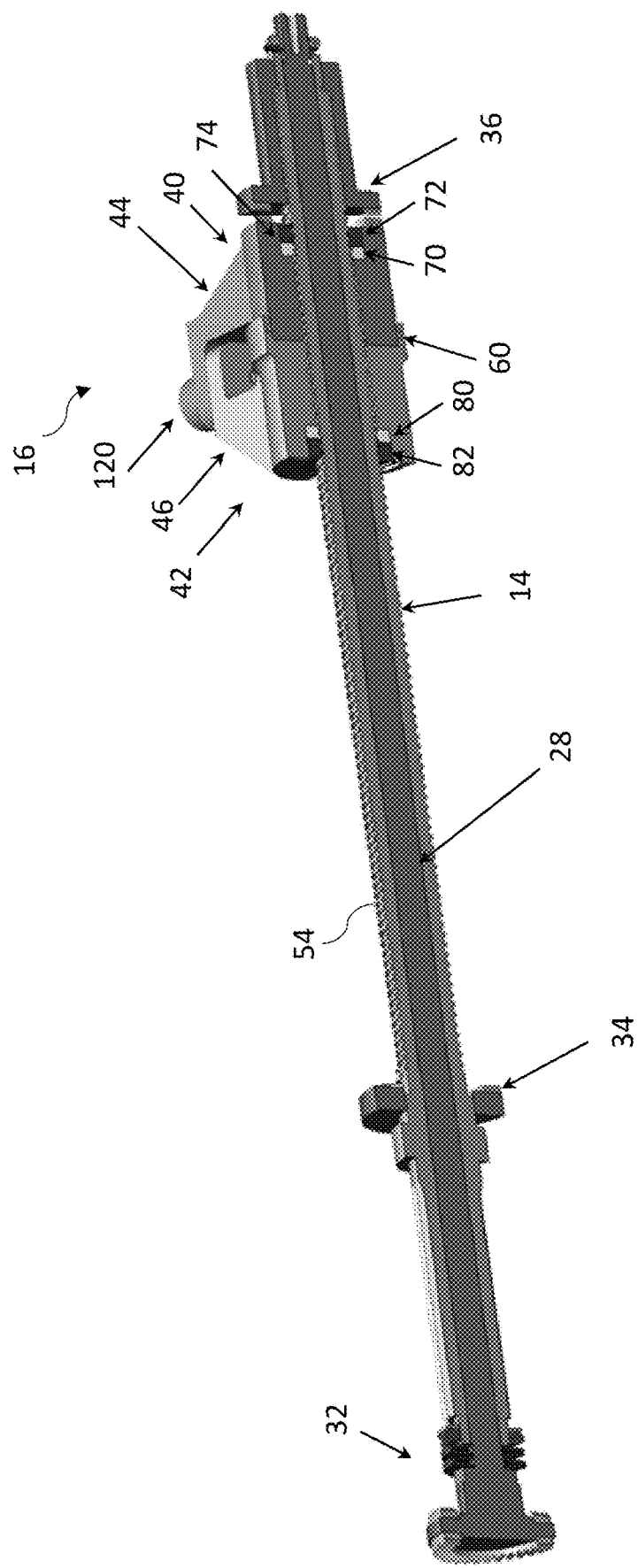
FIG. 4 is a cross-sectional perspective view of an embodiment of an actuator including a ball nut according to teachings of the present disclosure.

In embodiments, such as generally illustrated in FIGS. 1 and 2, an actuator 10, such as a linear actuator, may include a drive assembly 12, a ball screw 14, and/or a ball nut 16. The drive assembly 12 may be configured to drive the ball screw 14, such as via one or more motors 18 (see, e.g., FIG. 1), to cause rotation of the ball screw 14, which may cause translation of the ball nut 16 along the ball screw 14. For example and without limitation, rotation of the ball screw 14 may cause the ball nut 16 to move between a retracted position, such as generally illustrated in FIGS. 1-3, and an extended position, such as generally illustrated in FIG. 4. The drive assembly 12 may be connected to a first component 20 and the ball nut 16 may be connected to a second component 22. Actuation of the actuator 10 may move the second component 22 (e.g., linearly) relative to the first component 20.

In embodiments, an actuator 10 may be utilized in connection with one or more of a variety of applications. For example and without limitation, the actuator 10 may be utilized in connection with a horizontal trim stabilizer of an aircraft.

With embodiments, such as generally illustrated in FIG. 2, an actuator 10 may be configured with one or more redundancies, such as with a primary load path and a secondary load path. A primary load path may, for example and without limitation, include the ball screw 14, a first nut member 40 of the ball nut 16, some or all of the drive assembly 12, and/or a first attachment portion 24 (e.g., of a gimbal housing) that may be disposed at or about a proximate end 26 of the actuator 10. A secondary load path may, for example and without limitation, include a tie rod 28 disposed at least partially within the ball screw 14, a second nut member 42 of the ball nut 16, and/or a second attachment portion 30 (e.g., of the gimbal housing). Under normal/intended conditions, loads may be transmitted via the primary load path. In the event of a failure of one or more components of the primary load path, loads may be transmitted via the secondary load path. The tie rod 28 may include a locking arrangement 32. Mechanical stops 34, 36 may limit maximum movement of the ball nut 16 along the ball screw 14.

In embodiments, such as generally illustrated in FIGS. 5A and 5B, a ball nut 16 may include a first nut member 40, a second nut member 42, a first arm 44, and/or a second arm 46. The first nut member 40 and the second nut member 42 may include one or more of a variety of shapes, sizes, configurations, and/or materials. For example and without limitation, the first nut member 40 and/or the second nut member 42 may include substantially cylindrical configurations and may be metal. The first nut member 40 and/or the second nut member 42 may include internal threads 50, 52 that may be correspond to (e.g., engage, receive ball bearings disposed in, etc.) threads 54 of the ball screw 14. Threads 50 of the first nut member 40 may correspond to threads 52 of the second nut member 42 such that the first nut member 40 and the second nut member 42 may move substantially uniformly along the ball screw 14. For example and without limitation, threads 50, 52 of the first nut member 40 and the second nut member 42 may be formed via the same operation (e.g., the first nut member 40 and the second nut member 42 may be drilled and tapped together).

In embodiments, the second nut member 42 may include a recess 56 that may be configured to receive a portion of the first nut member 40. For example and without limitation, the first nut member 40 may be inserted, at least to some degree, into the recess 56 of the second nut member 42 in an axial direction. The recess 56 may include a circumferential groove 58 and a sealing member 60 may be disposed in the groove 58, such as to provide a fluid seal between the first nut member 40 and the second nut member 42.

With embodiments, the first nut member 40 may include a seal 70 and/or a scraper 72 that may be disposed at or about an end of the first nut member 40 opposite the second nut member 42. The first nut member 40 may include an internal circumferential groove/recess 74 and one or both of the seal 70 and the scraper 72 may be disposed at least partially in the groove 74. The seal 70 and the scraper 72 may be disposed adjacent to each other, and the seal 70 may be disposed axially inward of the scraper 72. The scraper 72 may be externally visible, such as from a generally axial direction. The seal 70 and/or the scraper 72 may include internal threads that may correspond to the internal threads 50 of the first nut member 40 and to the threads 54 of the ball screw 14. The scraper 72 may be configured to move and/or remove material from the threads 54 of the ball screw 14, such as dirt, debris, and/or ice, among others. The seal 70 may be a dynamic seal and may provide a fluid seal. The second nut member 42 may include a seal 80 and/or a scraper 82 that may be configured in the same or a substantially similar manner as the seal 70 and the scraper 72, respectively, of the first nut member 40.

With embodiments, a first arm 44 may extend from the first nut member 40. The first arm 44 may include a first portion 90 and/or a second portion 92. The first portion 90 may extend substantially radially from an outer surface 110 of the first nut member 40. The second portion 92 may extend substantially axially from the first portion 90, such as from an outer end of the first portion 90. The second portion 92 may extend axially beyond the first nut member 40 and extend such that at least some of the second portion 92 is disposed radially outward of the second nut member 42. The first portion 90 and the second portion 92 may, for example and without limitation, include a generally L-shaped configuration. In embodiments, the first arm 44 may be fixed to the first nut member 40 and/or may integrally formed with the first nut member 40, such as, for example and without limitation, via additive manufacturing.

In embodiments, a second arm 46 may extend from the second nut member 42. The second arm 46 may include a first portion 100 and/or a second portion 102. The first portion 100 may extend substantially radially from an outer surface 112 of the second nut member 42. The second portion 102 may extend substantially axially from the first portion 100, such as from an outer end of the first portion 100. The second portion 102 may extend axially beyond the second nut member 42 and extend such that at least some of the second portion 102 is disposed radially outward of the first nut member 40. The first portion 100 and the second portion 102 may, for example and without limitation, include a generally L-shaped configuration. In embodiments, the second arm 46 may be fixed to the second nut member 42 and/or may integrally formed with the second nut member 42, such as, for example and without limitation, via additive manufacturing.

With embodiments, the second portion 102 of the second arm 46 may be disposed radially inward of the second portion 92 of the first arm 44. The second portions 92, 102 of the arms 44, 46 may be disposed in an overlapping configuration (e.g., in a radial direction) and/or may be disposed adjacent to each other (e.g., an inner surface of the second portion 92 may be in contact with an outer surface of the second portion 102). One or both of the second portions 92, 102 may be disposed at a radial distance R from outer surfaces 110, 112 of the first nut member 40 and the second nut member 42, which may provide visual access to portions of the outer surfaces 110, 112 of the nut members 40, 42 radially inward of the arms 44, 46. For example and without limitation, the first arm 44 and the second arm 46 may provide a generally rectangular opening/chamber 114 that may be defined between the first portions 90, 100 of the arms 44, 46, the second portions 92, 102 of the arms 44, 46, and the outer surfaces 110, 112 of the nut members 40, 42. With embodiments of ball nuts 16, visual access may be provided to substantially all or all of the outer surfaces 110, 112 of the nut members 40, 42.

In embodiments, the first portions 90, 100, and/or the second portion 92, 102 may include one or more of a variety of configurations. For example and without limitation, the first portions 90, 100, and/or the second portion 92, 102 may be substantially planar. Additionally or alternatively, the first portions 90, 100, and/or the second portion 92, 102 may include one or more curved sections.

In embodiments, the first arm 44 and the second arm 46 may be connected together, such as via a pin 120. The pin 120 may, additionally or alternatively, be configured to facilitate connection of the ball nut 16 with the second component 22, such as an aircraft component to be actuated. The pin 120 may include one or more of a variety of shapes, sizes, configurations, and/or materials. For example and without limitation, the pin 120 may include a generally cylindrical configuration that may extend substantially radially.

With embodiments, the second portion 92 of the first arm 44 may include a first aperture 122 and/or the second portion 102 of the second arm 46 may include a second aperture 124. The first aperture 122 and the second aperture 124 may extend in a radial direction and/or may be substantially aligned (e.g., in a radial direction), at least in a connected configuration of the first nut member 40 and the second nut member 42. The pin 120 may be disposed in the first aperture 122 and in the second aperture 124. For example and without limitation, the first aperture 122 and/or the second aperture 124 may be threaded and the pin 120 may be screwed into the first aperture 122 and/or the second aperture 124. The integrity of the pin 120 may be verified by unscrewing the pin 120 from the apertures 122, 124. The pin 120 may be configured to restrict relative movement between the first nut member 40 and the second nut member 42, and/or may be configured to transfer loads between the first nut member 40, the second nut member 42, and/or the second component 22. The first arm 44 may include a pin receiving portion 126 that may include a generally cylindrical configuration that may extend in substantially radially outward from the second portion 92. The first aperture 122 may be extend through the second portion 92 and/or the pin receiving portion 126. In embodiments, an inner shaft 128 may be disposed/nested in the pin 120, such as to provide redundancy in case of a failure of the pin 120.

In embodiments, a ball nut 16 may include one or more arms in addition to the first arm 44 and/or the second arm 46. For example and without limitation, a ball nut 16 may include a third arm 130 and/or a fourth arm 140. The third arm 130 may be configured in a substantially similar or the same manner as the first arm 44. The fourth arm 140 may be configured in a substantially similar or the same manner as the second arm 46. For example and without limitation, the third arm 130 and the fourth arm 140 may include first portions 132, 142 and second portions 134, 144, respectively, that may be disposed L-shaped configurations. The second portions 134, 144 may be disposed in an overlapping configuration that may be disposed at a radial distance from the outer surfaces 110, 112 of the nut members 40, 42 to provide visual access to portions of the outer surfaces 110, 112 radially inward of the second portions 134, 144.

With embodiments, the first arm 44 and the second arm 46 may be circumferentially offset from and/or axially aligned with the third arm 130 and the fourth arm 140. For example and without limitation, the first arm 44 and the second arm 46 may be circumferentially offset from the third arm 130 and the fourth arm 140 by about 180 degrees (e.g., the third arm 130 and the fourth arm 140 may be disposed opposite the first arm 44 and the second arm 46). A second pin 146 may connect the third arm 130 with the fourth arm 140. It should be understood that while ball nuts 16 are generally illustrated with four arms, embodiments of ball nuts 16 may include more arms or fewer arms.

In embodiments, such as generally illustrated in FIG. 5B, a ball nut 16 may include one or more internal ball return features 150. Ball return features 150 may be configured to return ball bearings 152 from an end of a ball circuit to the beginning of the ball circuit. A ball return feature 150 may, for example and without limitation, include an internal passage formed in one or both of the nut members 40, 42. The internal ball return features 150 may be used instead of external ball return features, such as external return tubes or caps, and embodiments of ball nuts 16 may not include any such external features.

Figure 6B:
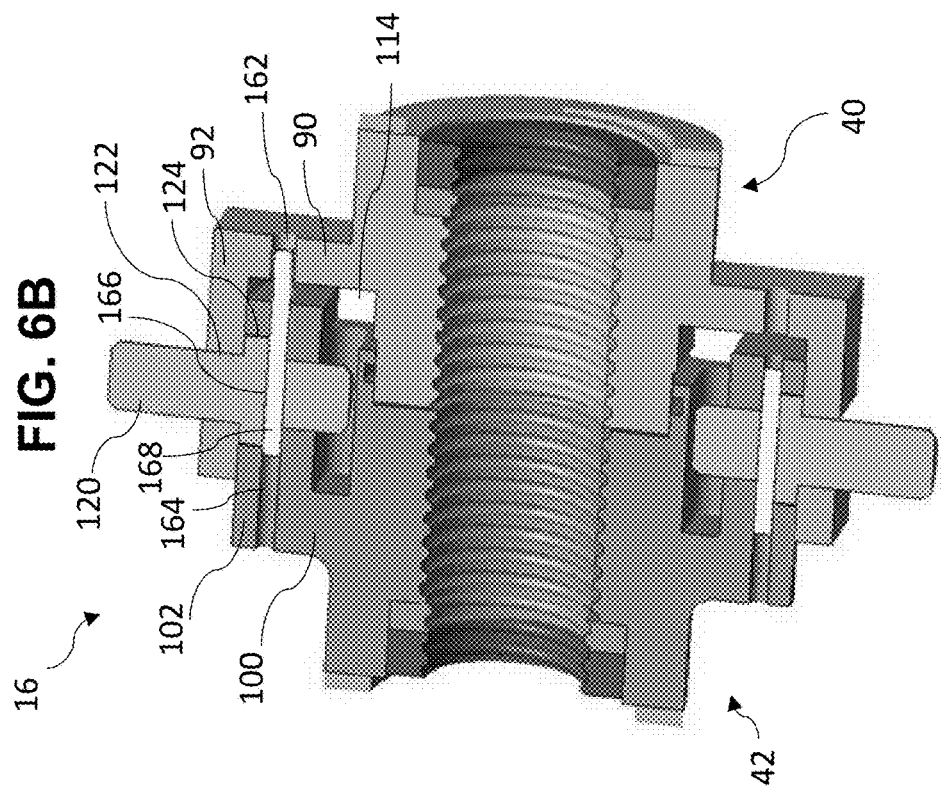
FIG. 6B is a cross-sectional perspective view of an embodiment of a ball nut according to teachings of the present disclosure.
Figure 6A:
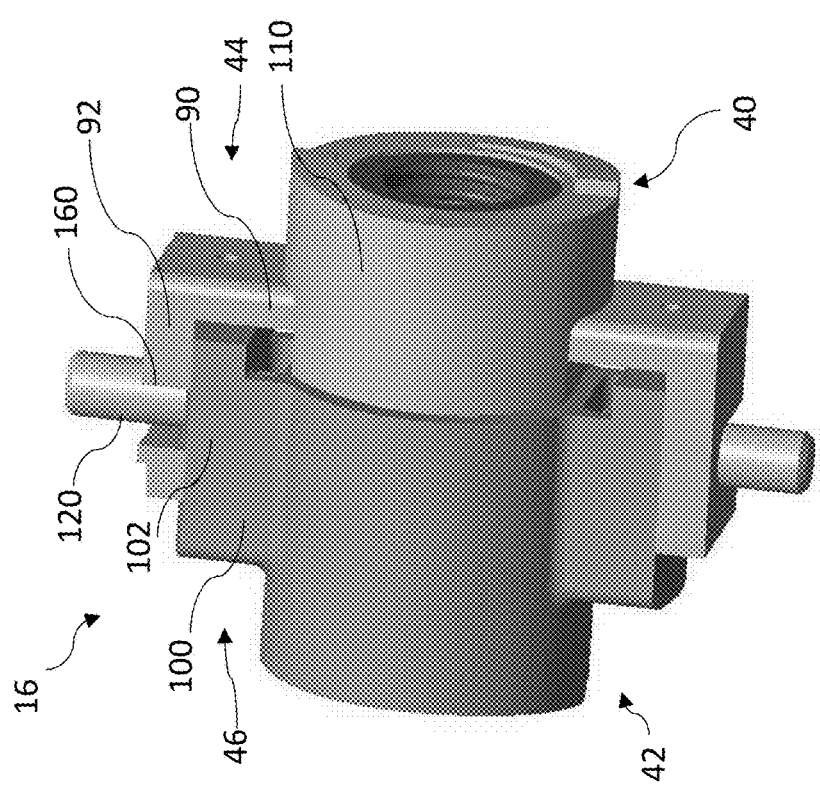
FIG. 6A is a perspective view of an embodiment of a ball nut according to teachings of the present disclosure.

With embodiments, such as generally illustrated in FIGS. 6A and 6B, the second portion 92 of the first arm 44 may include a circumferentially-extending slot 160, such as instead of a first aperture 122. The slot 160 may be configured to receive a pin 120, such as from a circumferential direction. Connecting the first nut member 40 with the second nut member 42 may include inserting the first nut member 40 into the recess 56 of the second nut member 42 while the first arm 44 is circumferentially offset from the second arm 46. The first nut member 40 and/or the second nut member 42 may be rotated such that the first arm 44 radially overlaps with the second arm 46 (e.g., such that the first arm 44 and the second arm 46 are circumferentially aligned) and/or such that the pin 120 slides, in a circumferential direction, into the slot 160.

In embodiments, the first arm 44 may include a third aperture 162, the second arm 46 may include a fourth aperture 164, and/or the pin 120 may include a fifth aperture 166. The third aperture 162 may extend through the first portion 90 of the first arm 44. The fourth aperture 164 may extend through the second portion 102 of the second arm 46. The third aperture 162, the fourth aperture 164, and/or the fifth aperture 166 may extend substantially axially. The pin 120 may be inserted into the second aperture 124 (and into/through the fourth aperture 164) such that the fifth aperture 166 of the pin 120 is substantially aligned with the fourth aperture 164 of the second arm 46. A shaft 168 may be inserted (e.g., axially) into the fourth aperture 164 and the fifth aperture 166, which may restrict relative movement between the pin 120 and the second arm 46 (and the second nut member 42). In a disconnected position of the first nut member 40 relative to the second nut member 42, the third aperture 162 may not be aligned with fourth aperture 164 or the fifth aperture 166. In a connected position, the third aperture 162 may be aligned with fourth aperture 164 and the fifth aperture 166, and the shaft 168 may be inserted (e.g., further inserted) into the third aperture 162 such that the shaft 168 is disposed in the third aperture 162, the fourth aperture 164, and the fifth aperture 166, which may restrict relative movement between the first nut member 40, the second nut member 42, and the pin 120. The shaft 168 may extend substantially axially.

Figure 7D:
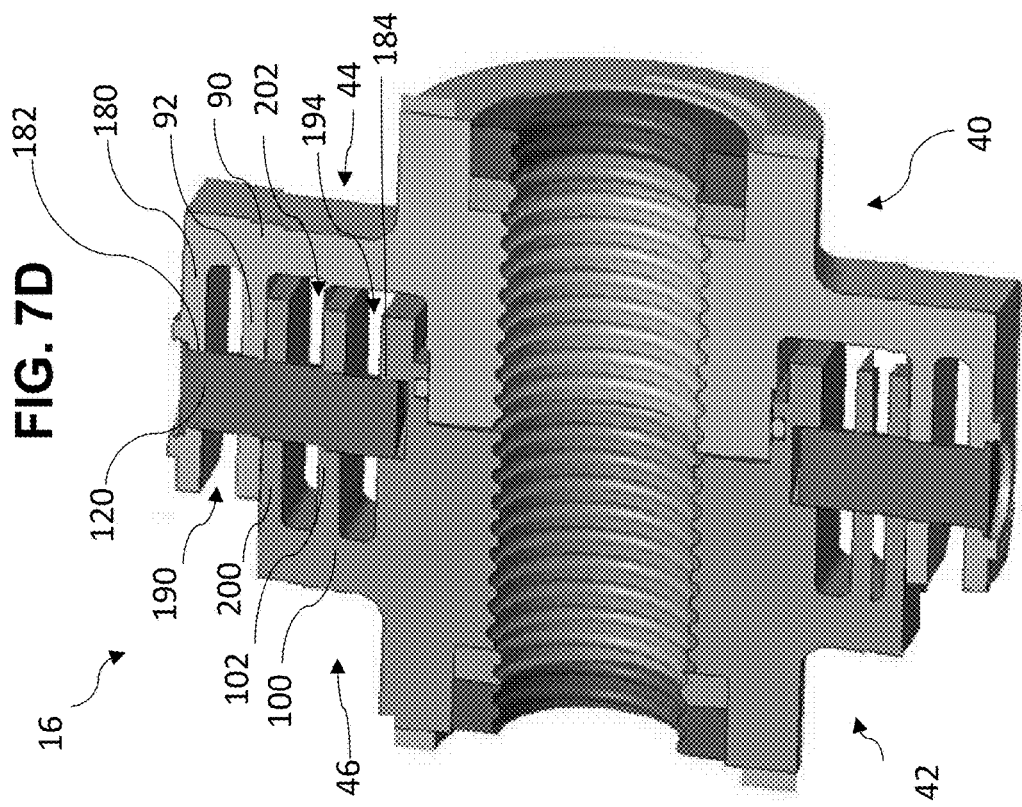
FIG. 7D is a cross-sectional perspective view of an embodiment of a ball nut according to teachings of the present disclosure.
Figure 7C:
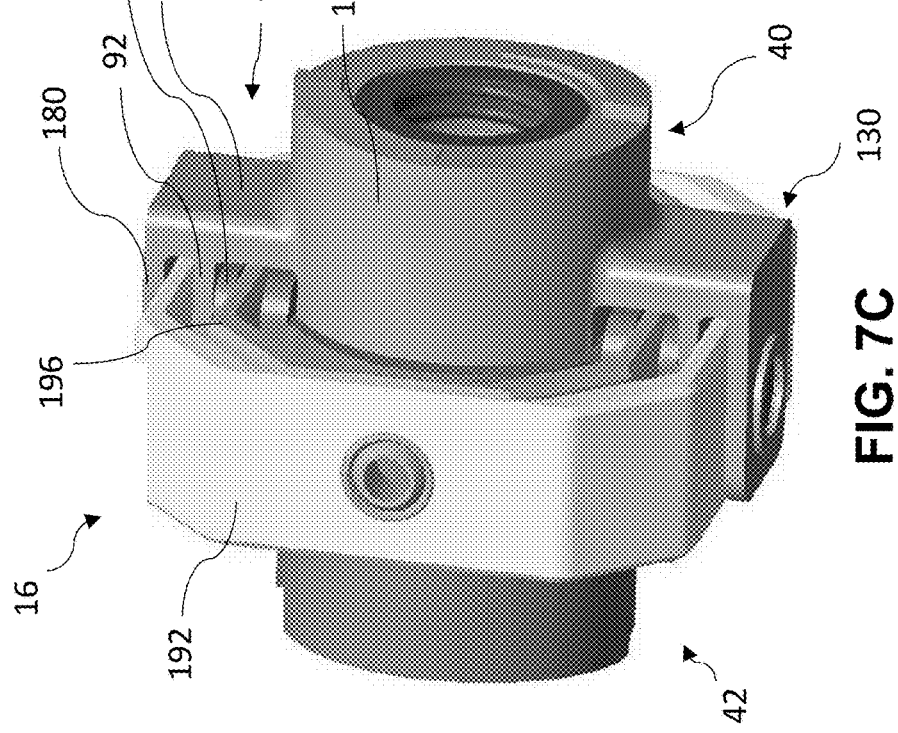
FIG. 7C is a perspective view of an embodiment of a ball nut and gimbal rings according to teachings of the present disclosure.

In embodiments, such as generally illustrated in FIGS. 7A, 7B, and 7C, a first arm 44 may include a third portion 180 that may extend from the first portion 90. The third portion 180 may, for example and without limitation, extend substantially parallel to the second portion 92 and may be radially-spaced from the second portion 92 such that the third portion 180 is radially outward of the second portion 92. The pin 120 may extend through the first aperture 122, the second aperture 124, and/or an aperture 182 of the third portion 180. Additionally or alternatively, the pin 120 may extend into a recess 184 in the outer surface 112 of the second nut member 42. The pin 120 may separately and simultaneously engage two portions of the first arm 44 (e.g., the second and third portions 92, 180), a portion of the second arm 46 (e.g., the second portion 102), and a portion of the second nut member 42 (e.g., the recess 184). The second portion 92 of the first arm 44, the third portion 180 of the first arm, and the second portion 102 of the second arm 46 may overlap in a radial direction.

With embodiments, the second portion 92 and the third portion 180 of the first arm 44 may provide a first gap 190 that may be configured to receive a first gimbal ring 192. The first gimbal ring 192 may be configured for connection with the pin 120, such as portions of the pin 120 disposed radially between the second portion 92 and the third portion 180. The outer surface 112 of the second nut member 42 and the second portion 102 of the second arm 46 may provide a second gap 194 that may be configured to receive a second gimbal ring 196. The second gimbal ring 196 may be configured for connection with the pin 120, such as portions of the pin 120 disposed radially between the second portion 102 and the outer surface 112 of the second nut member 42. In embodiments, a third arm 130 and a fourth arm 140 may include similar or the same configurations as the first arm 44 and the second arm 46, respectively, and the second pin 146 may connect the third arm 130, the fourth arm 140, the first gimbal ring 192, and/or the second gimbal ring 196 together.

In embodiments, such as generally illustrated in FIG. 7D, the second arm 46 may include a configuration that may be similar to the first arm 44. For example and without limitation, the second arm 46 may include a third portion 200 that may disposed radially inward of the second portion 102. The third portion 200 and the second portion 102 may provide a third gap 202 at a radial distance from the outer surfaces 110, 112 of the nut members 40, 42 and configured to receive the second gimbal ring 196. The second gap 194 may then provide improved visual access to the outer surfaces 110, 112 of the nut members 40, 42 (e.g., the second gimbal ring 196 may not be disposed in the second gap 194 and the second gap 194 may be empty).

With embodiments of ball nuts 16, the outer surfaces 110, 112 of the first nut member 40 and the second nut member 42 may be substantially or entirely visually unobstructed such that faults/defects in the first nut member 40 and the second nut member 42 may be readily visually detected. In embodiments, a ball nut 16 may not be directly connected to any wires, sensors, and/or covers that may impair viewing of the first nut member 40 and/or the second nut member 42 (or that may not be practical to connect to a ball nut 16 that may translate along the ball screw 14).

In embodiments, ball nuts 16 may include several redundancies. For example and without limitation, a ball nut 16 may include two nut members 40, 42, two pairs of arms 44, 46, 130, 140 connected by respective pins 120, 146, an inner shaft 128, a shaft 168, a pin 120 connected to four separate portions of the ball nut 16, and/or connections to two gimbal rings 192, 196, among others.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A ball nut, comprising:
   a first nut member;
   a second nut member; and
   a first arm extending from the first nut member, the first arm including:
   a first portion, and
   a second portion;

a second arm extending from the second nut member, the second arm including: a first portion and a second portion;

wherein the first portion of the first arm extends radially outward from the first nut member, and the first portion of the second arm extends radially outward from the second nut member;

wherein the second portion of the first arm extends substantially axially from the first portion of the first arm such that at least part of the second portion of the first arm is disposed radially outward of at least part of the second portion of the second arm; and wherein an externally visible opening with a radial distance is provided between (i) the second portion of the second arm and (ii) a portion of the first nut member or the second nut member that is radially inward of the second portion of the second arm.

2. The ball nut of claim 1, wherein the first arm and the second arm are substantially externally visible.

3. The ball nut of claim 1, wherein the second portion of the second arm extends in an axial direction from the first portion of the second arm.

4. The ball nut of claim 3, including pin disposed at least partially in the second portion of the first arm and at least partially in the second portion of the second arm.

5. The ball nut of claim 3, wherein the second portion of the first arm is in contact with an outer surface of the second portion of the second arm; and an inner surface of the second portion of the second arm is disposed at a distance from an outer surface of the second nut member.

6. The ball nut of claim 1, wherein the second portion of the first arm and the second portion of the second arm are disposed in an overlapping configuration.

7. The ball nut of claim 1, wherein the first nut member extends partially into the second nut member.

8. The ball nut of claim 1, wherein the second portion of the first arm includes a circumferential slot configured to receive a pin.

9. The ball nut of claim 8, including the pin; wherein the pin is disposed in an aperture of the second portion of the second arm and in the circumferential slot.

10. The ball nut of claim 9, including a shaft extending in a substantially axial direction.

11. The ball nut of claim 10, wherein the shaft is disposed at least partially in an axially-extending aperture of the second arm and an axially-extending aperture of the pin.

12. The ball nut of claim 11, wherein the shaft is disposed in an axially-extending aperture in the first portion of the first arm.

13. The ball nut of claim 1, wherein the first arm is disposed such that portions of outer surfaces of the first nut member and the second nut member radially inward of the arm are externally visible.

14. The ball nut of claim 1, wherein the first nut member and the second nut member include corresponding internal thread portions configured to engage a ball screw.

15. The ball nut of claim 1, wherein the first arm includes a third portion that extends substantially parallel with and at a radial distance from the second portion.

16. A ball nut, comprising:
a first nut member;
a second nut member; and
a first arm extending from the first nut member, the first arm including:
a first portion, and
a second portion;
a second arm extending from the second nut member and connected to the first arm;
wherein the first portion of the first arm extends radially outward from the first nut member;
wherein the second portion of the first arm extends substantially axially from the first portion of the first arm such that at least part of the second portion of the first arm is disposed radially outward of the second nut member; wherein the first arm includes a third portion that extends substantially parallel with and at a radial distance from the second portion; and wherein the second arm includes a first portion extending radially outward from the second nut member and a second portion extending substantially axially from the first portion of the second arm.

17. The ball nut of claim 16, including a pin disposed in an aperture of the second portion of the first arm, an aperture of the third portion of the first arm, an aperture of the second portion of the second arm.

18. The ball nut of claim 17, wherein the pin, the first arm, and the second arm are configured for connection with a first gimbal ring and a second gimbal ring.

19. The ball nut of claim 16, wherein the second portion of the first arm, the third portion of the first arm, and the second portion of the second arm overlap in a radial direction.

20. A ball nut, comprising:
a first nut member;
a second nut member; and
a first arm extending from the first nut member, the first arm including:
a first portion, and
a second portion;
a second arm extending from the second nut member and connected to the first arm;
wherein the first portion of the first arm extends radially outward from the first nut member;
wherein the second portion of the first arm extends substantially axially from the first portion of the first arm such that at least part of the second portion of the first arm is disposed radially outward of the second nut member; and including a third arm extending from the first nut member and a fourth arm extending from the second nut member;
wherein the third arm and the fourth arm are connected together in an overlapping configuration.

* * * * *